United States Patent [19]

Basset et al.

[11] 4,439,670

[45] Mar. 27, 1984

[54] METHOD AND DEVICE FOR THE CHECKING OF THE NUMBER OF ACCESS ATTEMPTS TO AN ELECTRONIC STORE, NOTABLY THAT OF AN INTEGRATED CIRCUIT OF AN OBJECT SUCH AS A CREDIT CARD OR A BUYER'S CARD

[75] Inventors: Jean-Claude Basset; Guy Belenfant, both of Paris, France

[73] Assignee: Electronique Marcel Dassault, Paris, France

[21] Appl. No.: 440,697

[22] Filed: Nov. 10, 1982

Related U.S. Application Data

[63] Continuation of Ser. No. 211,969, Dec. 1, 1980, abandoned.

[30] Foreign Application Priority Data

Nov. 30, 1979 [FR] France ................................ 79 29587

[51] Int. Cl.³ ............................................. G06K 5/00
[52] U.S. Cl. .................................... 235/382; 235/380; 235/381; 235/382.5
[58] Field of Search ............ 235/380, 381, 382, 382.5; 340/543, 825.32

[56] References Cited

U.S. PATENT DOCUMENTS

| Re. 30,580 | 4/1981 | Goldman | 235/380 X |
|---|---|---|---|
| 3,587,051 | 6/1971 | Hovey | 340/825.32 |
| 3,755,776 | 8/1973 | Kotras | 340/543 |
| 4,021,796 | 5/1977 | Fawcett | 340/825.32 |
| 4,204,113 | 5/1980 | Giraud | 235/380 |
| 4,256,955 | 3/1981 | Giraud | 235/380 |

*Primary Examiner*—Harold I. Pitts
*Attorney, Agent, or Firm*—Pollock, Vande Sande & Priddy

[57] ABSTRACT

An access trial control device for a card, such as a financial or business transaction card or the like, which is inserted in an access terminal for use and carries a confidential code which is compared with an access code type by the user on the terminal. For each access trial the result, acceptance or refusal, of the comparison is permanently recorded by non volatile memory means in the card. The number of consecutive access trials refused is counted in a counter and is detected by a control circuit which disables the card when such number reaches a predetermined value. Each accepted access trial resets the counter to zero.

9 Claims, 3 Drawing Figures

Fig. 1

| STORE FOR ATTEMPT | 1 | 2 | 3 | 4 | 5 | 6 | 7 | 8 | 9 | 10 | 11 | 12 | 13 | 14 | --- | k,1 | --- | 250 |
|---|---|---|---|---|---|---|---|---|---|---|---|---|---|---|---|---|---|---|
| STORE STATE OF REFUSED TRIALS | 0 | 1 | 0 | 0 | 0 | 0 | 0 | 1 | 0 | 1 | 0 | 1 | 1 | 1 | | 0 | | 0 |
| REFUSAL ADDRESS | 0 | 2 | 4 | 6 | 8 | 10 | 12 | 14 | 16 | 18 | 20 | 22 | 24 | 26 | | 2k | | 498 |
| STORE STATE OF ACCEPTED TRIALS | 1 | 0 | 1 | 1 | 1 | 1 | 1 | 0 | 1 | 0 | 1 | 0 | 0 | 0 | | 0 | | 0 |
| ACCEPTANCE ADDRESS | 1 | 3 | 5 | 7 | 9 | 11 | 13 | 15 | 17 | 19 | 21 | 23 | 25 | 27 | | 2k-1 | | 499 |

Fig. 2

| | PREVIOUS ADDRESS | BINARY REPRESENTATION OF THE PREVIOUS ADDRESS | NEW ADDRESS |
|---|---|---|---|
| ACCEPTANCE $A = 1$ | $2k$ | $a_n\ a_{n-1}\ \text{-----}\ a_1\ 0$ | |
| | $2k+1$ | $a_n\ a_{n-1}\ \text{-----}\ a_1\ 1$ | $2k+3$ |
| REFUSAL $A = 0$ | $2k$ | $a_n\ a_{n-1}\ \text{-----}\ a_1\ 0$ | $2k+2$ |
| | $2k+1$ | $a_n\ a_{n-1}\ \text{-----}\ a_1\ 1$ | |

METHOD AND DEVICE FOR THE CHECKING OF THE NUMBER OF ACCESS ATTEMPTS TO AN ELECTRONIC STORE, NOTABLY THAT OF AN INTEGRATED CIRCUIT OF AN OBJECT SUCH AS A CREDIT CARD OR A BUYER'S CARD

This is a continuation of application Ser. No. 211,969, filed Dec. 1, 1980 abandoned.

FIELD OF THE INVENTION

The invention relates to a method and device for the checking of the number of access attempts to an electronic store, notably that of an integrated circuit of a portable object such as a credit card or a buyer's card.

BRIEF DESCRIPTION OF THE PRIOR ART

A card of such type may be introduced in an apparatus or terminal designed for carrying out and recording an operation or transaction, such as a banknote distributor or a debiting-crediting apparatus placed at a shopkeeper's, the transaction being effective only after having checked, thanks to the electronic store included in the integrated circuit of the card, that a certain number of conditions are fulfilled, such as the fact of communicating to the apparatus the code alloted to the card owner, for example a determined succession of figures.

Such a card is known in which any transaction attempt, when the result of the checking is negative, is recorded in a permanent way in the store of the integrated circuit, for example by destruction of a fusible point or dot of the latter by a storing current of a relatively high value provided by the terminal.

When the number of unsuccessful attempts thus recorded exceeds a predetermined value, the card is made unusable. Thereby is avoided the fraud which would consist, for a person in possession of the card but not being the rightful owner, to communicate successively to the apparatus all the possible combinations of figures forming a code, which would imply a considerable number of attempts.

For preventing swindlers to be in a position, by interposing a current limiter in the terminal-card connections, to avoid the recording in the latter of an unsuccessful attempt, or simply to draw back the card as soon as the current increases in the connection, there has been proposed to supply the known card with a current also when the result of the checking is positive, so as to simulate the storing current, said current passing then through a dissipation resistor included in the card owing to routing means peculiar to the latter.

The presence in the card integrated circuit of a dissipation resistive element is nevertheless a disadvantage since, on the one hand said element is necessarily bulky, and on the other hand the simulation of the storing current is not perfect.

Moreover, the known card does not make a distinction between the successive refused trials or unsuccessful attempts and those which are not, thereby making difficult its use for the preliminary checkings which are indispensable for the execution of banking transactions.

BRIEF DESCRIPTION OF THE PRESENT INVENTION

An object of the invention is to obviate such disadvantages. Another object is to provides a card which may be used, once its use has been blocked in a first terminal, in a second terminal different from the first, for example for a last attempt.

The checking method according to the invention is characterized in that all the access attempts are stored, be they accepted or refused, as well as the results of each attempt: an acceptance or a refusal.

The use of a dissipation resistor is then made useless, and the identity of the storing currents circulating in the terminal-card connections in the case of acceptance and in the case of a refusal is ensured, thereby making sterile the observation by a swindler of the storing current.

The whole of the access attempts being memorized, it is then easy to block the operation of the card once a predetermined number of refused and consecutive access attempts has been reached, thereby avoiding the blockage which would be caused by sporadic erroneous maneuvers of the card's rightful owner.

As an alternative, the terminal comprises means preventing the use of the card after three successive refused attempts registered in the card, the latter remaining nevertheless usable on an other terminal for at least one extra attempt. Each attempt for access is recorded permanently on the card with separate indications of valid and invalid attempts.

Advantageously, said store elements are formed by two registers, or store words, respectively reserved to the accepted attempts and to the refused attempts, the addresses of the register elements being chosen such that a single counter can, without calculations, determine as a function of the result of the checking process the address of the register following element which has to be used.

Thus can be utilized a particular integrated circuit for each type of card, instead of a microprocessor circuit, thereby allowing increasing the difficulty of the frauds.

BRIEF DESCRIPTION OF THE FIGURES

In the following description which is given by way of example, reference is made to the accompanying drawing in which:

FIG. 1 is a diagram of store elements and of their addresses;

FIG. 2 is a Table;

DETAILED DESCRIPTION OF THE INVENTION

Figure 3:
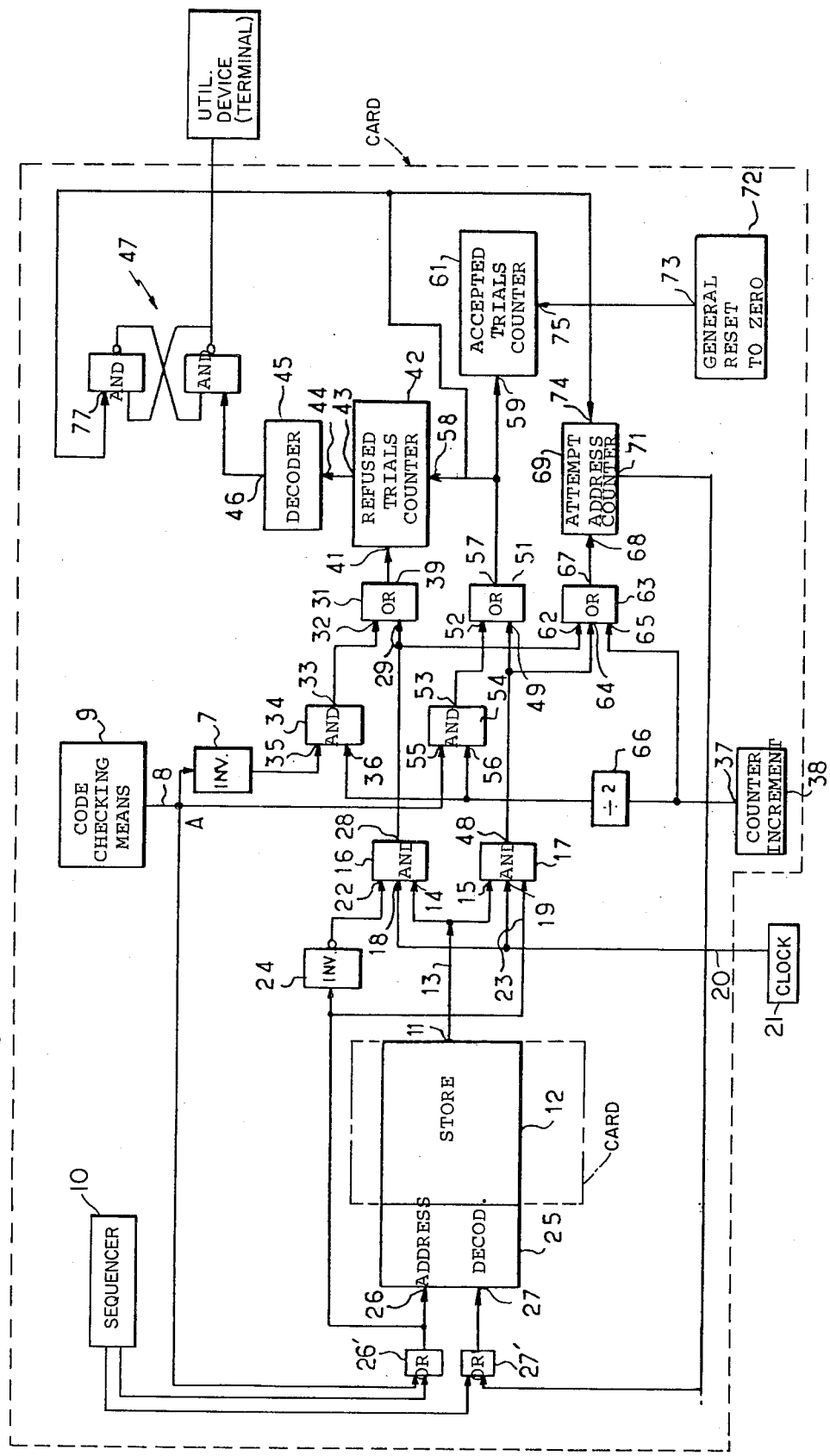
FIG. 3 is a block-diagram of the device according to the invention.

After the introduction by a user of a card having an integrated circuit in a terminal, the confidential code number which is stored in the integrated circuit of the card is compared with the code number introduced by the user in the terminal, for example through a keyboard, the operation to which the terminal is adapted being effected, and the access to the store of the integrated circuit being effective, only if the result of the comparision or check is positive, viz. if the two code numbers are identical.

According to the invention, each access trial or attempt, that is each communication by the user of a code number, is recorded by the card store, at the same time as the result of the comparison.

For so doing, the store comprises a number of elements, forming a word or a register, and which are reserved to the access attempts refused by the card, as well as an identical number of elements forming an extra word or register, and which are reserved to the attempts accepted by the card.

For example, and without that the following figures have a whatsoever limiting value, each of the stores for the refused or accepted attempts comprises 250 elements (FIG. 1) which are initially all in a predetermined state, viz. logical state zero, said number being superior to the number of transactions, for example 150, possible with the same card.

When, as is shown in FIG. 1, the first attempt by the rightful owner of the card has been accepted, the first store element of the word corresponding to the accepted attempts is brought to logical state 1, and retains this state even when the card is not energized, viz. when it is drawn back from the terminal.

To this effect, the store for the refused and accepted attempts is made of a non volatile store, for example of the programmable or reprogrammable type, with a fusible point or short-circuit point, etc.

In FIG. 1 has been represented the state of the acceptance and refusal stores after the fourteen first attempts by the user of the card, attempts 1, 3 to 7, 9 and 11 having been accepted, and attempts 2, 8, 10 and 12 to 14 having been refused.

In the example shown, it has been assumed that the three first consecutive refused attempts, viz. attempts 12 to 14, would cause the blockage of the card, by means known per se.

It is advantageous to adopt, for the addresses of the refusals store elements, even numbers, and for the addresses of the store elements corresponding to the accepted trials, odd numbers, said numbers being separated by a given even number, viz. two in the example in consideration; the addresses of the refusals store elements vary in such a case for example between 0 and 498, and those of the elements of the accepted trials store between 1 and 499.

As a matter of fact, if the output signal A of the card code comparison or checking means passes to logical state 1 when the attempt is accepted (FIG. 2), and to the zero logical state when the attempt has been refused, it is enough, for knowing the new address of the store element, to add FIG. 2 to the previous address, represented in the binary code, the bit of smallest weight of which being modified so as to make it identical to the output of the checking means. A simple counter allows thus determining the new address without calculations.

In FIG. 3 the individual components of the access checking device, which communicate with a utilization device (terminal) are seen to be enclosed in a card with the exception of an external clock.

The read-out output 11 of the refusal and acceptance store 12 (FIG. 3) is connected by a connection 13 to the first inputs 14, 15 of AND gates 16, 17 respectively, the second inputs 18, 19 of gates 16 and 17 are commonly connected to the output 20 of a clock device 21, for example included in the terminal. The third inputs 22, 23 of gates 16 and 17 are connected to the output of the card code checking device 9, through OR gate 26' with interposition between the input 22 of the AND gate 16 and the output 8 of the code checking means 9 of an inverter 24. The store 12 is preceded by an address decoder 25, a first input 26 of which is connected to the output of an OR gate 26' one input of which is connected to the output 8 of the checking means 9 and the other input of which is under the command of a sequencer 10. The first input 26 of decoder 25 receives thus the signal A from the output 8 of the code checking means 9, forming the bit of smallest weight ($a_o$) of the store element address which has to be recorded, and the second input 27 of decoder 25 being connected, for receiving the other bits constituting of the address, viz. $a_n \ldots a_1$, to the output of an OR gate means element 27' an input of which is connected to the output 71 of an address counter of the trials 69 and the other input of which is under the command of the sequencer.

The output 28 of the AND gate 16 is connected to a first input 29 of an OR gate 31, the second input 32 of which is connected to the output 33 of an AND gate 34. A first input 35 of AND gate 34 is connected to the output of the code checking means 9, via inverter 7. The second input 36 of gate 34 is connected to the output 37 of a pulse generator 38, via of a divide by two circuit 66.

The output 39 of the OR gate 31 is connected to the counting or clock input 41 of a counter 42 for the refused trials. The output 43 of counter 42 is connected to the input 44 of a decoder 45, the output 46 of which is connected to a flip-flop 47.

The output 48 of AND gate 17 is connected to a first input 49 of an OR gate 51, the second input 52 of which is connected to the output 53 of an AND gate 54. The first input 55 of gate 54 is connected to the output 8 of the code checking means 9, and the second input 56 of gate 54 is connected to the output 37 of the pulse generator 38 via the divider 66.

The output 57 of the OR gate 51 is connected on the one hand to the reset to zero input 58 of the refused trial counter 42, and on the other hand to the counting or clock input 59 of a counter for the accepted trials 61.

The input 29 of the OR gate 31 is also fed to a first input 62 of an OR gate 63, the second input 64 of which is connected to the first input 49 of the OR gate 51, and the third input 65 of which is connected to the output 37 of pulse generator 38. The output 67 of the OR gate 63 is connected to the counting or clock 68 input of a counter 69 for the attempt addresses, the output 71 of which is connected to the input 27 of the address decoder 25 via OR gate means 27'.

A general reset to zero device 72 has its output 73 connected to the zero reset inputs 74, 75, 58 and 77 respectively of counters 69, 61, 42 and of flip-flop 47.

The operation of the device is the following:

As soon as a user introduces a card in the terminal, the card sequencer 10 carries out a number of initialization operations and this quickly enough so that said operations are finished before the user has had the time of introducing his confidential code in the terminal. During this initialization phase, the store 12 remains in the state it has acquired at the end of the previous access attempt, while the counters 42, 61, 69 and the flip-flop 47 on the contrary, which are in an arbitrary state when the card is not in a terminal, are reset to zero by means of the general reset to zero 72 acting on the inputs 58, 75, 74 and 77 respectively of said elements.

The sequencer 10 brings then the address decoder 25 inputs 26 and 27 to the logical states necessary for a read-out of all the store 12 elements to be carried out successively, viz. a read-out of the state of the refusal store element having address zero, then a read-out of the state of the acceptance store element having address one, then the read-out of the state of the refusal store element having address 2, and so forth until the read-out of the state of the acceptance store element having address 499.

During this read-out, the counter of the accepted trials 61 records the total number of trials present in the acceptance store, viz. eight in the example shown in FIG. 1, and this through AND gate 17 and OR gate 51.

During this sequence also, the refused trials counter 42 records the number of consecutive refused trials present in the refusal store, through the AND 16 and OR 31 logical elements, the counter 42 being reset to zero by the signal appearing at its input 58 each time an accepted trial is read in the store 12.

In the example shown in FIG. 1, the counter 42 will pass thus to state 1 at the third read-out step, then will come back to the zero state, and so forth until it acquires successively state 1, state 2 and state 3 during the successive read-out sequences twenty-three, twenty-five and twenty-seven. At that moment, the decoder 45 is energized, and this switches over flip-flop 47 and blocks by known means the operation of the card in a terminal (utilization device).

If on the contrary the refusal store has not already recorded three consecutive non accepted trials, the operation of the card is not interrupted, and the counter 42 indicates at the end of the initialization phase the value 0 or 1 according to whether the last recorded trial has been accepted or refused and value 2 if the two last trials have been refused, in the same terminal or in a different terminal.

Also, during the same read-out sequence, the trial addresses counter, the state of which increases by one unit each time a refusal or an acceptance is read in store 12, is brought, at the end of the read-out cycle, to the state corresponding to the address of the last recorded store element, viz. that corresponding to the last attempt.

The initialization phase is then ended and the device may now take in account the new trials carried out by the card owner.

During these trials, the various counters change state, not under the action of the output 11 of the store 12, which remains at its zero logical state, but under the action of the outputs 33, 53 of the AND gates 34 and 54, receiving on their respective inputs, on the one hand the pulses coming from the pulse generator 38 or counter increment device, and on the other hand the output signal A or its reverse $\overline{A}$ from of the code checking means 9.

In the same manner as previously, as soon as three consecutive refused trials are recorded in counter 42, whereby one or two of said trials can as a matter of fact have been carried out by the owner of the card previously to the trials presently taken in account, the decoder 45 blocks the operation of the card.

For each trial carried out, the attempts address counter 69 is incremented, under the effect of the signal received on its input 68, by two units, so that its output 71 corresponds to bits $a_n \ldots a_1$ of the new address of the store element in which the new trial has to be recorded, the bit $a_0$ being supplied to it by the output 8 of the checking means 9.

In an alternative embodiment of the device according to the invention, the decoder 45 brings about a change of state of flip-flop 47, and thereby inhibits card use, only when the value recorded by the unsuccessful attempts counter reaches number 4.

The terminal in which the card is introduced comprises then a device similar to the previously described device, which blocks the use of the card in the terminal at the end of the third trial. However, the card may still be used a last time without blockage on another terminal, the user having thus the possibility of checking meanwhile his confidential code. This mode of operation allows not to penalize the owner of the card for operational errors of a terminal.

In one or the other of the previously described alternative embodiments, the card may be provided with a discrimination means between the access attempt refusals due to a wrong code being typed by the user and the refusals due to erroneous transmissions of the code typed by the user, so tha the attempt is not taken in account in the latter case by the device counters.

Likewise, the terminal may be or may not be connected to a central data processor.

We claim:

1. A data bearing card or the like for gaining access to a utilization device, the card comprising means for storing an identification code which is interrogated for validity during an access attempt, said card further comprising permanent recording means of all valid and invalid access attempts and of the indication resulting from such respective attempts.

2. A card according to claim 1, wherein said recording means comprise respective first and second store positions for the recording of the attempts recognized as valid and for the recording of the attempts recognized as invalid.

3. A card according to claim 1, wherein said recording means are of the non-destructive type.

4. A circuit for validating correct access to a utilization device, said circuit incorporated in a portable object and comprising:
   means incorporating an identification code of the object for undergoing interrogation during each access attempt; and
   means for permanently recording all the consecutive access attempts which are recognized as valid or invalid.

5. A circuit for validating current access to a utilization device, said circuit incorporated in a portable object and comprising:
   means for permanently recording consecutive valid and invalid access attempts;
   means for initializing said circuit when any access attempt is made;
   means for reading out attempt data from said permanent recording means during initializing;
   means for counting consecutive invalid access attempts derived from the read-out of said recording means; and
   means for detecting a pedetermined count of consecutive invalid attempts;
   wherein said counting means is reset in response to a valid access attempt, when said valid attempt occurs before said predetermined invalid attempt count occurs.

6. A circuit for validating correct access to a utilization device, said circuit incorporated into an object, and wherein each access attempt is instituted by an interrogation of said object to ascertain access validity, the circuit comprising:
   means adapted for permanently recording all invalid and valid access attempts;
   counting means for detecting the occurrence of a preselected number of invalid attempts for preventing access to the utilization device;
   means adapted for resetting said counting means in response to a signal indicating the occurrence of a valid access attempts prior to an occurrence of the preselected number of invalid attempts; and means adapted for initializing said counting means by a read-out of said recording means at the moment of each connection of said circuit to a utilization device occurring before completion of the first access attempt following said connection.

7. A method for restricting the use of a data bearing card or the like havng a permanent memory, the card enabling completion of a transaction with a controlled access data terminal, the method comprising the steps:
comparing a code stored in the card memory with a code entered on the terminal for validating an attempted transaction;
storing the result of the validation attempt in the card memory at a first memory address;
computing the total number of accepted and rejected transactions upon reintroduction of the card to a terminal, prior to validation of codes;
comparing the code stored in the cord memory with a code entered in the terminal for validating another attempted transaction, the result of the latter validation stored at a second memory address dependent upon the first but removed therefrom by a preselected integer;
changing the least significant bit of the first address by a binary zero if an unfavorable validation attempt occurs and by a binary one if a favorable validation attempt occurs;
storing the result of each succeeding validation attempt; and prohibiting validation when a predetermined number of consecutive invalid attempts are made.

8. A data bearing card or the like for validating an attempted transaction with a controlled access data terminal, the card comprising:
a non-destructive memory for storing the occurrence of each attempted transaction and the result thereof;
the memory having a first register for storing the valid attempts and a second register for storing the invalid attempts, the first register having even addresses and separated from other addresses in this register by a preselected even number, varying between 0 and 2k; and
the second register having odd addresses and separated from other addresses in this register by the same number and varying between 1 and 2k+1.

9. The data bearing card set forth in claim 8, wherein the terminal comprises:
means for comparing a code encoded on the card with a code entered on the terminal and generating a signal indicating a valid code entry;
a counter connected to the code comparing means for incrementing a count indicative of an invalid entry;
means connected in circuit with the code comparing means for resetting the counter in response to a valid code entry; and
means for decoding a preselected count in the counter and preventing further use of the card.

* * * * *